(12) United States Patent
Sharma et al.

(10) Patent No.: US 11,348,163 B1
(45) Date of Patent: May 31, 2022

(54) SYSTEM FOR PRESENTING SIMPLIFIED USER INTERFACE

(71) Applicant: AMAZON TECHNOLOGIES, INC., Seattle, WA (US)

(72) Inventors: Shaleen Kumar Sharma, Seattle, WA (US); Jingwei Cao, Seattle, WA (US); Kamlendra Kumar, Seattle, WA (US); Amit Sinha, Redmond, WA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 53 days.

(21) Appl. No.: 16/522,458

(22) Filed: Jul. 25, 2019

(51) Int. Cl.
*G06Q 30/02* (2012.01)
*G06Q 30/06* (2012.01)
*G06F 9/451* (2018.01)
*G06F 3/0482* (2013.01)
*G06F 3/16* (2006.01)

(52) U.S. Cl.
CPC ....... *G06Q 30/0641* (2013.01); *G06F 3/0482* (2013.01); *G06F 9/451* (2018.02); *G06Q 30/0222* (2013.01); *G06F 3/167* (2013.01)

(58) Field of Classification Search
CPC ............ G06Q 30/0641; G06Q 30/0222; G06F 9/451; G06F 3/0482; G06F 3/167
See application file for complete search history.

(56) References Cited

U.S. PATENT DOCUMENTS

| | | | | |
|---|---|---|---|---|
| 6,587,835 B1 * | 7/2003 | Treyz | ...................... | G06Q 20/12 705/14.64 |
| 7,637,426 B1 * | 12/2009 | Green | ..................... | G06Q 30/06 235/383 |
| 8,204,799 B1 * | 6/2012 | Murray | .............. | G06Q 10/0835 705/26.81 |

(Continued)

FOREIGN PATENT DOCUMENTS

| | | | | |
|---|---|---|---|---|
| KR | 10-0836754 B1 * | 6/2008 | ............. | G06Q 30/06 |
| KR | 10-1655372 B1 * | 9/2016 | ............. | G06F 3/048 |

OTHER PUBLICATIONS

Carousel Design Pattern [retrieved on Jul. 22, 2019]. Retrieved from the Internet: http://ui-patterns.com/patterns/Carousel.

(Continued)

*Primary Examiner* — David J Stoltenberg
(74) *Attorney, Agent, or Firm* — Lindauer Law, PLLC

(57) ABSTRACT

Upon selection of an item, several acquisition options may be available for a user to acquire that item. The attributes of these options vary based on price, delivery speed, and so forth. Differences between a reference option and other options are determined. These differences are used to determine a caption identifier. Caption output data is determined based the caption identifier and presented within a user interface with a corresponding control. The control allows the user to acquire the item using the corresponding option. The caption provides the user with a concise and clear reason as to why a particular option is beneficial to the user. For example, a "Willing to wait?" caption shows an acqui- (Continued)

sition option for which the item is available at lower cost but longer delivery time than the reference option. Services may obtain the caption output from a caption generator using an application programming interface (API).

20 Claims, 11 Drawing Sheets

(56) References Cited

U.S. PATENT DOCUMENTS

| | | | | |
|---|---|---|---|---|
| 8,577,740 | B1* | 11/2013 | Murray | G06Q 10/0835 |
| | | | | 705/26.1 |
| 9,430,777 | B1* | 8/2016 | Strand | G06Q 30/0283 |
| 9,552,566 | B1* | 1/2017 | Katz | G06Q 20/12 |
| 10,489,841 | B1* | 11/2019 | Ogborn | G06Q 30/0629 |
| 10,754,518 | B1* | 8/2020 | Bell | H04L 67/26 |
| 10,754,916 | B1* | 8/2020 | Rehn | G06Q 10/0833 |
| 10,922,743 | B1* | 2/2021 | Andrizzi | G06F 3/0481 |
| 2002/0152135 | A1* | 10/2002 | Beeri | G06Q 30/0253 |
| | | | | 705/14.51 |
| 2006/0277118 | A1* | 12/2006 | Keohane | G06Q 30/0641 |
| | | | | 705/27.1 |
| 2007/0005449 | A1* | 1/2007 | Mathew | G06F 16/958 |
| | | | | 705/26.1 |
| 2007/0033110 | A1* | 2/2007 | Philipp | G06Q 30/0621 |
| | | | | 705/5 |
| 2008/0228592 | A1* | 9/2008 | Kotas | G06Q 10/087 |
| | | | | 235/376 |
| 2009/0222337 | A1* | 9/2009 | Sergiades | G06Q 30/0239 |
| | | | | 705/14.23 |
| 2011/0022980 | A1* | 1/2011 | Segal | G07F 9/023 |
| | | | | 715/810 |
| 2011/0082771 | A1* | 4/2011 | Pritikin | G06Q 30/0641 |
| | | | | 705/27.1 |
| 2011/0125609 | A1* | 5/2011 | Burger | G06Q 10/087 |
| | | | | 705/27.1 |
| 2011/0288922 | A1* | 11/2011 | Thomas | G06Q 30/0224 |
| | | | | 705/14.23 |
| 2011/0295670 | A1* | 12/2011 | Thomas | G06Q 30/0201 |
| | | | | 705/14.25 |
| 2012/0078731 | A1* | 3/2012 | Linevsky | G06Q 30/0603 |
| | | | | 705/14.73 |
| 2012/0123910 | A1* | 5/2012 | George | G06Q 30/0641 |
| | | | | 705/27.1 |
| 2012/0166268 | A1* | 6/2012 | Griffiths | G06Q 30/0222 |
| | | | | 705/14.23 |
| 2013/0066750 | A1* | 3/2013 | Siddique | G06Q 30/0601 |
| | | | | 705/27.2 |
| 2013/0132238 | A1* | 5/2013 | Evans | G06Q 30/0641 |
| | | | | 705/26.61 |
| 2013/0212487 | A1* | 8/2013 | Cote | H04N 21/431 |
| | | | | 715/745 |
| 2013/0297390 | A1* | 11/2013 | Jaquez | G06Q 20/12 |
| | | | | 705/14.23 |
| 2014/0095264 | A1* | 4/2014 | Grosz | H04N 1/00 |
| | | | | 705/7.36 |
| 2014/0258003 | A1* | 9/2014 | Celis | G06Q 30/0277 |
| | | | | 705/14.73 |
| 2014/0279223 | A1* | 9/2014 | Lampert | G06Q 30/0625 |
| | | | | 705/26.35 |
| 2015/0193859 | A1* | 7/2015 | Colello | G06Q 30/0635 |
| | | | | 705/14.23 |
| 2015/0309706 | A1* | 10/2015 | Reed | G06F 16/22 |
| | | | | 715/771 |
| 2016/0063615 | A1* | 3/2016 | Watterson | G06Q 30/0643 |
| | | | | 705/27.2 |
| 2016/0071149 | A1* | 3/2016 | Farshori | G06T 19/006 |
| | | | | 705/14.51 |
| 2016/0247182 | A1* | 8/2016 | Peterson | G06Q 30/0222 |
| 2017/0024804 | A1* | 1/2017 | Tepfenhart, Jr. | G06Q 30/0635 |
| 2017/0161728 | A1* | 6/2017 | Satyanarayan | G06Q 20/401 |
| 2017/0278139 | A1* | 9/2017 | Vaya | G06Q 30/0269 |
| 2017/0345105 | A1* | 11/2017 | Isaacson | H04W 12/0609 |
| 2018/0040084 | A1* | 2/2018 | Pareek | G06Q 30/06 |
| 2018/0130104 | A1* | 5/2018 | Montgomery | G06Q 30/04 |
| 2018/0197132 | A1* | 7/2018 | Nayak | G06Q 30/0633 |
| 2018/0218403 | A1* | 8/2018 | McDonough | G06Q 30/0222 |
| 2018/0268468 | A1* | 9/2018 | Levy | G06Q 30/0603 |
| 2018/0321818 | A1* | 11/2018 | Treadway | G06F 9/451 |
| 2018/0365725 | A1* | 12/2018 | Smith | G06Q 30/0222 |
| 2019/0122245 | A1* | 4/2019 | Sahay | G06Q 10/08345 |
| 2019/0220883 | A1* | 7/2019 | Lore | G06Q 30/0222 |
| 2019/0333137 | A1* | 10/2019 | Nguyen | G06Q 30/0635 |
| 2020/0151659 | A1* | 5/2020 | Mangalassery Gregory | G06F 16/29 |
| 2020/0160428 | A1* | 5/2020 | Calvo | G06Q 10/0834 |
| 2020/0327534 | A1* | 10/2020 | Swanson | G06Q 20/12 |
| 2020/0357012 | A1* | 11/2020 | Kendall | G06Q 30/0222 |
| 2020/0387864 | A1* | 12/2020 | Shi | G06Q 10/0838 |

OTHER PUBLICATIONS

Chen, Angela, "Unlocking the Secrets Hidden Inside your Voice", The Verge, Apr. 9, 2019, 1 page. Retrieved from the Internet: https://www.theverge.com/2019/4/9/18300456/voice-analysis-artificial-intelligence-mental-health-companion-mx-business-privacy.

* cited by examiner

ACQUISITION OPTION DATA 114

| OPTION ID 202 | OPTION RANK 204 | ATTRIBUTE DATA 206 | | | | |
|---|---|---|---|---|---|---|
| | | SELLER ID 208 | PRICE 210 | DELIVERY TIME 212 | DELIVERY TYPE 214 | NEW/USED 216 |
| 1 | 1 | 371 | 15.00 | 1.0 | GROUND | NEW |
| 2 | 2 | 375 | 13.00 | 5.5 | MAIL | NEW |
| 3 | 3 | 377 | 18.00 | 0.1 | DRONE | NEW |

CAPTION REQUEST 116

| ACQUISITION OPTION DATA 114 | CONTEXT DATA 230 |
|---|---|

DIFFERENCE DATA 122

| | TYPE(S) OF ATTRIBUTE 240 | | | | |
|---|---|---|---|---|---|
| OPTION ID 202 | SELLER DIFFERENCE 242 | PRICE DIFFERENCE 244 | DELIVERY TIME DIFFERENCE 246 | DELIVERY TYPE DIFFERENCE 248 | NEW/USED DIFFERENCE 250 |
| 1 | - | - | - | - | - |
| 2 | 375 | -2.00 | +4.5 | MAIL | NEW |
| 3 | 377 | +3.00 | -0.9 | DRONE | NEW |

CAPTION LIBRARY 126

| CAPTION ID 260 | BENEFIT TYPE 262 | LANGUAGE ID 264 | CAPTION TEXT 266 |
|---|---|---|---|
| 89415 | SHORTER DELIVERY TIME | EN | GET IT FASTER |
| 89416 | SHORTER DELIVERY TIME | EN | NEED IT NOW |
| 89417 | LOWER PRICE | EN | LIKE NEW, SAVE WITH USED |
| 89418 | LOWER PRICE | EN | USED BARGAIN |
| 89420 | LOWER PRICE | EN | WILLING TO WAIT |
| 89421 | LOWER PRICE | EN | NO HURRY |
| 89502 | TRY | EN | TRY BEFORE YOU BUY |

| USER PREFERENCE DATA 128 | | |
|---|---|---|
| USER ID 302 | PREFERRED BENEFIT TYPE 304 | PREFERRED LANGUAGE ID 306 |
| 54815 | SHORTER DELIVERY TIME | EN |
| 55913 | INCENTIVE PROGRAM | EN |
| 75517 | LOWER PRICE | DE |

| ACQUISITION HISTORY DATA 130 | | |
|---|---|---|
| USER ID 302 | SELECTED BENEFIT TYPE 320 | SELECTION % 322 |
| 54815 | SHORTER DELIVERY TIME | 95 |
| 54815 | LOWER PRICE | 5 |
| 55913 | LOWER PRICE | 100 |
| 77517 | DELIVERY TYPE | 100 |

| CAPTION OUTPUT DATA 132 | | |
|---|---|---|
| OPTION ID 202 | CAPTION TEXT 266 | CAPTION PRIORITY 340 |
| 2 | WILLING TO WAIT | 2 |
| 3 | GET IT FASTER | 1 |

FIG. 3

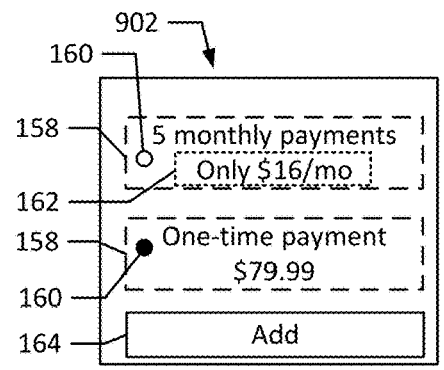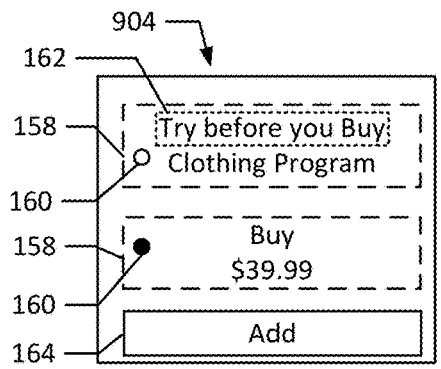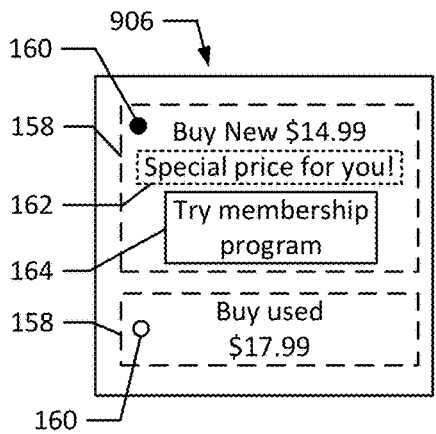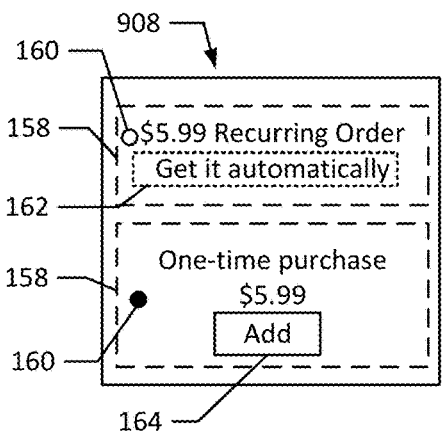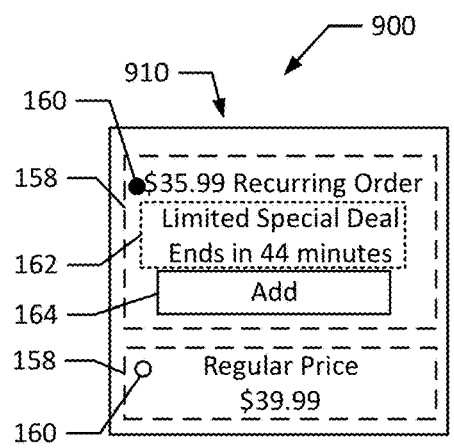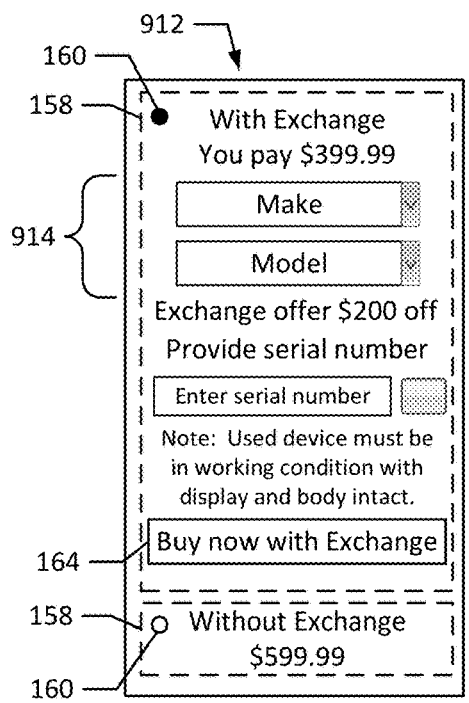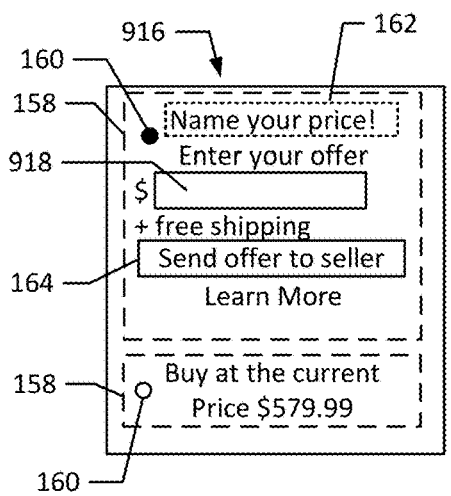
FIG. 9

SYSTEM FOR PRESENTING SIMPLIFIED USER INTERFACE

BACKGROUND

A user may acquire items such as goods or services online using various interfaces presented using various devices such as smartphones, tablets, voice activated devices, and so forth.

BRIEF DESCRIPTION OF FIGURES

The detailed description is set forth with reference to the accompanying figures. In the figures, the left-most digit(s) of a reference number identifies the figure in which the reference number first appears. The use of the same reference numbers in different figures indicates similar or identical items or features.

FIGS. 2 and 3 depict various types of data associated with determining the captions, according to one implementation.

FIGS. 9-11 depict user interfaces that may include captions, according to some implementations.

Figure 1:
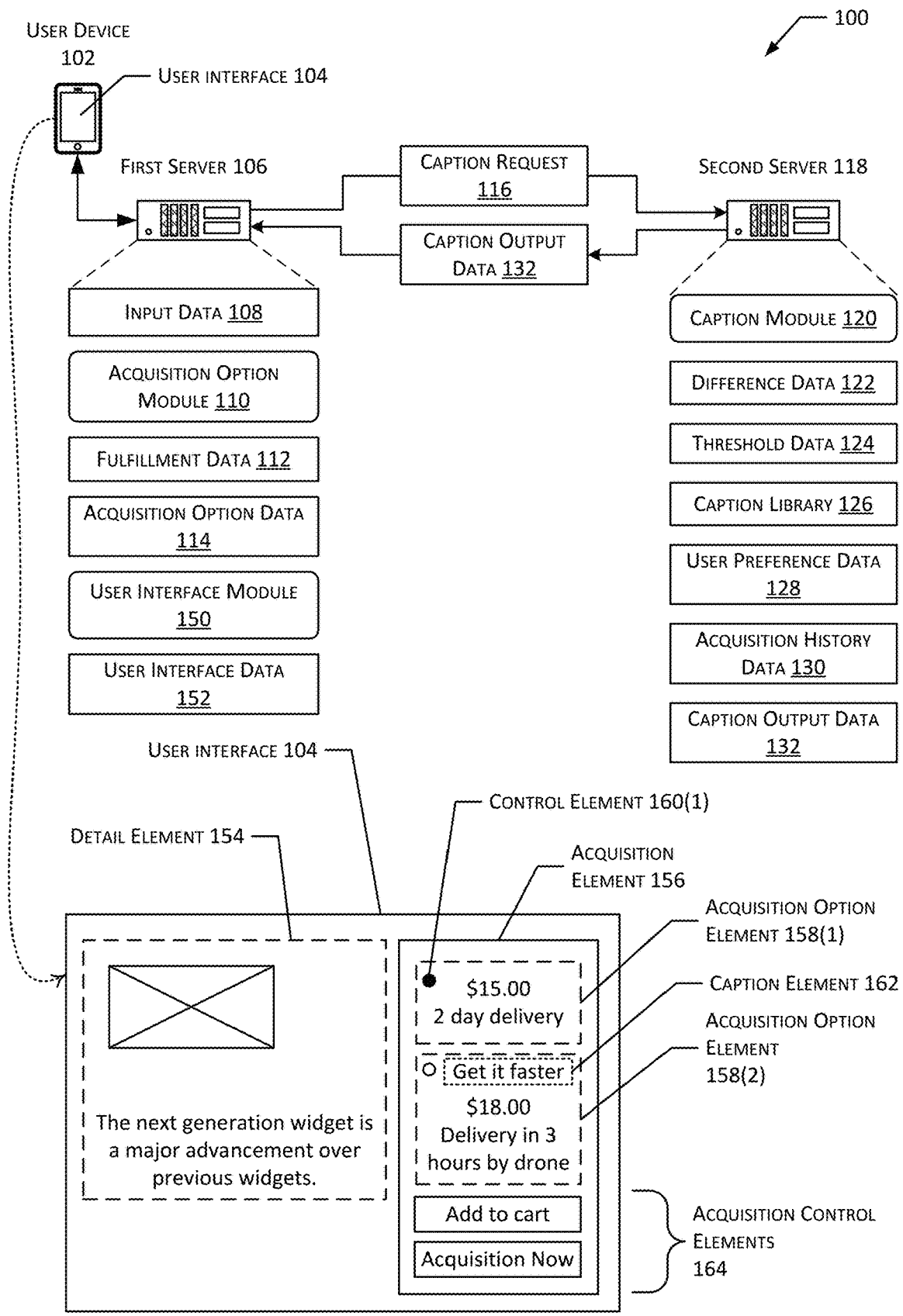
FIG. 1 depicts an implementation of a system for determining captions that describe concise reasons as to why a particular option is beneficial to a user and presenting those captions in a user interface, according to one implementation.

While implementations are described in this disclosure by way of example, those skilled in the art will recognize that the implementations are not limited to the examples or figures described. It should be understood that the figures and detailed description thereto are not intended to limit implementations to the particular form disclosed but, on the contrary, the intention is to cover all modifications, equivalents, and alternatives falling within the spirit and scope as defined by the appended claims. The headings used in this disclosure are for organizational purposes only and are not meant to be used to limit the scope of the description or the claims. As used throughout this application, the word "may" is used in a permissive sense (i.e., meaning having the potential to) rather than the mandatory sense (i.e., meaning must). Similarly, the words "include", "including", and "includes" mean "including, but not limited to".

DETAILED DESCRIPTION

A user may use a computing device to present a user interface through which the user is able to view items such as goods or services that are available for acquisition. The user may enter search terms, select various categories, view recommended items, and so forth. After a user selects a particular item for acquisition, the user may have many different acquisition options available. An acquisition option may be a particular combination of various attributes that describe the fulfillment of that acquisition for that particular item. For example, after picking a specific item for acquisition, the item may be available with different combinations of merchant from which to acquire the item, price, delivery speed, whether the item is new or used, and so forth.

In order to complete the acquisition, the user may need to select one of the acquisition options. However, a user may find it difficult to find how one acquisition option varies from another. The problem becomes acute as more than two acquisition options are available. The user may not be able to easily determine the benefit a particular acquisition option provides with respect to a default acquisition option. For example, to determine how one acquisition option differs from another, traditionally the user would need to carefully inspect the acquisition options while keeping track of this information, such as in their own memory, by taking notes, and so forth. This significantly increases the difficulty associated with the user making a selection of an acquisition option. As a result, the user may use the default acquisition option without considering the other acquisition options, or may select an acquisition option which is less than optimal to that user due to a misunderstanding. While trying to compare the various acquisition options, the user may navigate back-and-forth between the various options, which results in additional network calls and increase computational load. For example, the user may navigate to a first acquisition option, use the "back" control in their web browser, navigate to a second acquisition option, use the "back" control again, and so forth, with each of these resulting in various network calls that consume network bandwidth and computational resources that are used to respond to those calls.

Additionally, some user interfaces are constrained. For example, a user may use a graphical user interface (GUI) provided by a smartphone or tablet with limited display screen space. Continuing this example, the display screen is limited in space, and as a result there may be insufficient display space to present all information about the acquisition options simultaneously to allow the user to make a comparison and selection. In another example, the user may use a voice user interface (VUI) provided by a voice activated device that provides audio output and accepts audio input such as the user's speech. Continuing this example, the voice user interface is only able to present a single piece of information as a stream of audio, and lacks the ability to present several different acquisition options simultaneously for comparison. These constraints may significantly increase the difficulty associated with the selection of the acquisition option.

As a result of these drawbacks, presenting additional acquisition options using traditional techniques may result in a decrease in completion of acquisitions. For example, if the user is unable to keep track of the various acquisition options and their respective benefits, the user may become frustrated. As described above, this may result in either selection of a less than optimal acquisition option by the user, may result in the user abandoning the acquisition altogether, or could produce a negative user experience.

Described in this disclosure is a system that, based on the acquisition options available, determines captions that may then be presented to the user that describe pertinent differences of those acquisition options to assist the user in selection of an acquisition option. Initially, an item for a good or service has been determined. For example, the user may have searched for the item and is viewing a detail page in a GUI or listening to details about the item in a VUI. A set of acquisition options are determined, including a default or reference acquisition option. Attributes of the remaining (non-default) acquisition options are then compared to determine differences with respect to the reference acquisition option. For example, the first acquisition option is the reference acquisition option and has a sale price of $15 with two day delivery. The second acquisition option may have a sale price of $13 with five day delivery. The second acquisition option, with respect to the first acquisition option, exhibits differences of a $2 saving and an increase in the delivery time from two days to five days.

The differences are then used to determine an associated caption identifier that is indicative of a particular caption associated with a particular acquisition option. A caption may comprise a string of text, icon, logo, audio, or other information. The caption provides clear and concise information about differences between acquisition options, and may describe why a particular option is beneficial to the user. Continuing the earlier example, the second acquisition option may be associated with caption text such as "Willing to wait", "No hurry", or "Lower price".

In one implementation, a particular attribute and corresponding benefit may be prioritized. For example, a lower price may be prioritized as more advantageous than a decrease in shipment time. Prioritization may be predetermined, or may be specified based on user preference for a particular user, acquisition history data for a particular user, and so forth. Given the differences, a single acquisition option may have more than one possible caption which may be associated with different benefits. For example, one benefit may be reduced price while another benefit is a particular delivery method. The prioritization may be used to determine which caption to provide for a given acquisition option. For example, if a first caption and a second caption are both associated with a single acquisition option, the highest priority caption may be selected.

Caption output data is then used to generate user interface data. The user interface data is then used to present a user interface. For example, the caption output data may be used to generate a hypertext markup language (HTML) web page that, when rendered, presents on a display device a GUI that includes user interface elements such as acquisition option elements showing the available acquisition options and caption elements that present the captions associated with those acquisition options. In another example, the caption output data may be presented as a spoken description as the acquisition options are available. Continuing the example, the spoken description may be "get it faster for only three dollars more".

The determination of captions may be implemented by a caption server with a caption module that provides an application programming interface (API). Other servers, such as a server generating dynamic web content, may send an API request to the caption server. The API request may include a list of acquisition options, context data, and so forth. The caption server may respond with caption output data that includes caption text associated with each of the acquisition options.

With the presentation of the captions in the user interface, the user is able to quickly and effectively choose the acquisition option which offers the best benefit to them at that point in time. The generation and presentation of captions significantly improve the functionality and usability of making acquisitions from a constrained user interface, such as one with limited display area of a GUI or serial presentation such as with a VUI. By presenting the captions, the user does not need to navigate back-and-forth between several different user interfaces or pages to assess the various acquisition options. By removing this back-and-forth navigation, the amount of network traffic is reduced and computing resources are conserved.

FIG. 1 depicts an implementation of a system 100 for determining and presenting captions, according to one implementation. A user device 102 may comprise a smartphone, tablet, laptop, desktop computer, in-vehicle system, voice activated device, home automation system, and so forth. The user device 102 is capable of presenting a user interface 104. The user interface 104 may comprise a graphical user interface (GUI) comprising images presented on a display device and input from an input device such as a touch sensor or mouse, a voice user interface (VUI) that uses output from a speaker and input from a microphone, or combinations thereof.

A first server 106 is in communication with the user device 102. For example, the user device 102 may use a network such as the internet to communicate with the first server 106. The first server 106 provides functionality that allows a user of the user device 102 to acquire an item. An item may comprise a good or service. For example, the item may comprise a kitchen appliance that is physically delivered, a service to install the kitchen appliance, an ebook that is electronically delivered, and so forth. By way of illustration and not necessarily as a limitation, the examples in this disclosure describe acquisition of an item. It is understood that other acquisitions may include, but are not limited to purchases, rentals, leases, trade, barter, and so forth.

The first server 106 may receive input data 108 from the user device 102. For example, the user device 102 may send input data 108 that is representative of the user selecting detailed information about an item that a user of the user device 102 may want to acquire. The first server 106 may comprise an acquisition option module 110. The acquisition option module 110 may accept as input at least a portion of the input data 108 and access fulfillment data 112.

The input data 108 may indicate a particular item identifier (item ID). For example, the input data 108 may comprise user input to a search control, data indicative of selection of a particular item from a list, and so forth. In some implementations the input data 108 may comprise data from another module. For example, the input data 108 may comprise information that is indicative of a detail page providing information associated with a particular item ID.

The fulfillment data 112 may comprise data associated with fulfillment of an acquisition. For example, the fulfillment data 112 may comprise information indicative of a warehouse in which the item ID is available, stock level at the warehouse indicative of the quantity on hand, delivery types, and so forth.

The acquisition option module 110 uses the input data 108 and the fulfillment data 112 to determine acquisition option data 114. The acquisition option data 114 comprises a set of one or more acquisition options. For example, the input data 108 may indicate a particular item identifier (item ID). The acquisition option module 110 may then use the fulfillment data 112 to determine one or more merchants selling that particular item ID, price, stock levels, delivery types, delivery time, and so forth. This information is then used to determine an acquisition option.

Each of the acquisition options in the acquisition option data 114 is a particular combination of one or more attributes, such as seller, price, delivery type, delivery time, and so forth for acquisition of that item ID. In some implementations the acquisition option module 110 may rank the acquisition options in the acquisition option data 114. For example, the acquisition option module 110 may rank or sort the acquisition options based on one or more attributes, promotional consideration, delivery address, acquisition history, or other factors.

Depending upon various factors, such as the availability of the item, delivery address, and so forth, the acquisition option data 114 may include a plurality of acquisition options. For example, a given item ID may be available for acquisition from ten vendors, each vendor offering several possible delivery types, with different prices for the items, costs for shipping, and so forth. A single item ID may be associated with many different acquisition options. Presentation of the entire list would be infeasible and inadvisable. Infeasible as such a list, even in compact form, would use a significant amount of space on a display device in a GUI or require a tedious verbal recitation in a VUI. Such a presentation would be inadvisable as it would likely confuse the user, and may deter the user from completing the acquisition, or have the user complete the acquisition with an acquisition option that is not what they would have preferred had the presentation been simpler.

The first server 106 may send a caption request 116 to a second server 118. A caption module 120 at the second server 118 processes the caption request 116. The caption request 116 may include at least a portion of the acquisition option data 114. The caption request 116 is described in more detail with regard to FIG. 2.

The caption module 120 determines difference data 122 from the acquisition option data 114 in the caption request 116. One of the acquisition options may be designated as a reference acquisition option. For example, if the acquisition options are ranked, the first ranked acquisition option may be described as the reference acquisition option while the remaining acquisition options may be described as candidate acquisition options. The caption module 120 determines differences in the same types of attributes of the candidate acquisition options with respect to the reference acquisition option. For example, if the reference acquisition option has a delivery time of 2 days and a first candidate acquisition option has a delivery time of 5.5 days, the difference for the attribute "delivery time" of the candidate acquisition option would be "−3.5 days". Difference data 122 for several different attributes may be determined. Continuing the example, the reference acquisition option may have a price of $15 while the first candidate acquisition option has a price of $13, resulting in a difference for the attribute "price" of the first candidate acquisition option of $-2, indicating the first candidate acquisition option is less expensive than the reference acquisition option. The various attributes are discussed in more detail with regard to FIG. 2.

The caption module 120 may use threshold data 124 to determine when a difference is deemed to be significant. For example, a difference in cost that is greater than a threshold value of $1 may be deemed significant. In some implementations the threshold data 124 may specify a threshold of zero. For example, a difference in delivery time for a candidate acquisition option that is less than zero, that indicates a longer delivery time than the reference acquisition option, may be deemed less significant or not indicative of a benefit to the user in and of itself. In comparison, a difference in price that is less than zero, indicating a lower price, may be deemed more significant and indicative of a benefit to the user.

The caption module 120 accesses a caption library 126. The caption library 126 associates particular caption identifiers (IDs) with other information such as benefit type, language, caption text, and so forth. For example, the caption module 120 may use the difference data 122 as compared using the threshold data 124 to determine that the first candidate acquisition option has a longer delivery time (not necessarily a benefit to the user) with a lower price (a benefit to the user). The caption library 126 is discussed in more detail with regard to FIG. 2.

The caption module 120 may prioritize the benefits to be presented in a caption. For example, a reduced price may be prioritized over an increased delivery time for the purposes of selecting a caption. The priorities may be specified at a global or system-wide level, for a particular region, group of users, individual user, and so forth.

In some implementations, other information such as user preference data 128 may be used by the caption module 120. The user preference data 128 may specify that a particular user identifier associated with a user has a preferred benefit type, preferred language, and so forth. For example, user "Bob" may have a preference for a shorter delivery time while user "Ted" has a preference for lower price. The user preference data 128 is discussed in more detail with regard to FIG. 3.

The caption module 120 may also use acquisition history data 130. The acquisition history data 130 may provide information indicative of previous selections of acquisition options by a particular user. For example, user "Bob" may typically select the benefit type "shorter delivery time" 95% of the time and "lower price" 5% of the time. The caption module 120 may use the acquisition history data 130 to select a caption which is relevant to the user. In some implementations the acquisition history data 130 may be associated with a particular item ID, category of item, and so forth. For example, a particular user may historically choose a benefit type of "lower price" but an item such as an appliance repair part which is associated with more time sensitive activity may be associated with the benefit type of "shorter delivery time". The acquisition history data 130 is discussed in more detail with regard to FIG. 3.

Output from the caption module 120 is caption output data 132. The caption output data 132 provides caption output, such as caption text, for one or more of the acquisition options provided in the caption request 116. For example, the caption text "Willing to wait" may be provided for the first candidate acquisition option that involves a longer delivery time but lower price. The caption output data 132 is discussed in more detail with regard to FIG. 3.

The caption output data 132, or at least a portion thereof, is provided to the first server 106. A user interface module 150 of the first server 106 generates user interface data 152 from the acquisition option data 114 and the caption output data 132. In some implementations the user interface data 152 may comprise hypertext markup language (HTML), extensible markup language (XML), or other information that is processed to produce the user interface 104. In some implementations the user device 102 may generate at least a portion of the user interface data 152.

An example of the user interface 104 is depicted. The user interface 104 may comprise a detail element 154. The detail element 154 may present information such as details about a particular item ID, features of the item, pictures of the item, and so forth. An acquisition element 156 that presents information and controls associated with an acquisition is also shown. The acquisition element 156 may include one or more acquisition option elements 158. The acquisition option elements 158 present information about a particular acquisition option, such as present in the acquisition option data 114. For example, the acquisition option elements 158 may present information such as price, delivery time, and so forth. Also shown are control elements 160 to select a particular acquisition option. Each acquisition option element 158 may have a control element 160. For example, the control elements 160 may be implemented as a radio button control, allowing the user to select one of the acquisition options presented in the acquisition option elements 158. In some implementations the control element 160 may be non-visible or omitted. For example, the control element 160 may comprise a region within which an input such as a touch or click results in the selection of the associated acquisition options.

An acquisition option element 158 may include a caption element 162. In this illustration, the acquisition option element 158(1) presents the reference acquisition option from the acquisition option data 114. As this is the reference acquisition option as used by the caption module 120, no caption element 162 is present. The acquisition option element 158(2) depicts a first candidate acquisition option and the associated caption element 162 of "Get it faster". The user interface 104 thus simplifies the differences described in the difference data 122 and consolidates those differences down to a more concise and simpler user interface that may be accessed without the user changing screens, scrolling for more data, and so forth. As a result, the user interface 104 may be presented on a relatively small form factor display device, such as a wearable device, smartphone, tablet, laptop, and so forth.

Also shown are acquisition control elements 164. For example, button controls for "add to cart" and "buy now" are shown. Activation of either of these controls would initiate an acquisition of the item ID currently presented in the detail element 154 using the acquisition option selected by the control element 160(1) for a particular one of the acquisition option elements 158.

In some implementations, the second server 118 may implement an application programming interface (API). For example, the first server 106 may send the caption request 116 as an API request and respond with the caption output data 132.

While the first server 106 and the second server 118 are depicted as individual computing devices, it is understood that they each may comprise a plurality of computing devices, other computing devices (not shown) may also be used during operation of the system 100, and so forth. The various modules described herein may be implemented by one or more computing devices other than those shown. For example, the acquisition option module 110 may execute on a server different from that executing the user interface module 150.

The system 100 and examples in this disclosure are described with respect to a graphical user interface (GUI). It is understood that the system 100 may also be used to provide captions in the context of a voice user interface (VUI).

By using the system described in this disclosure, caption output data 132 is generated that may then be used to provide an improved user interface 104. A user may be informed as to the benefits that the different acquisition options provide relative to the reference acquisition option and select a particular acquisition option from the user interface 104 that best suits their needs. As a result, the user experience is improved.

The system also results in improved performance of the servers by reducing the computational resources associated with an acquisition. For example, by providing the captions which clearly and concisely summarize benefits to the user, the user is less likely to navigate to a different web page, query the system for more details about the acquisition options, and so forth. As a result, the system is able to service more users.

A reduction in the computational resources that are associated with an acquisition of a particular item may be achieved by selectively computing the acquisition options. For example, N acquisition options may be available for a particular item. The computations involved in determining each of the possible combinations of delivery information, pricing, and so forth, are computationally expensive and may result in a significant increase in network traffic, calls to other servers, and so forth. In some implementations, rather an determining the actual output for each of these possible combinations, the acquisition option module 110 may use approximations of this information to rank the acquisition options in the acquisition option data 114. Compared to the actual determination of the information for these combinations, the approximations are relatively lightweight with regard to use of computational resources. For example, the approximations may use one or more of heuristics, Monte Carlo methods, and so forth.

The caption module 120 may then determine, such as by calling another server, the actual information for a subset k of the n offers. This results in a significant decrease in the use of computational resources during operation. For example, k may have values of more than 100 while n may be less than 5.

FIGS. 2 and 3 depict various types of data associated with determining the captions, according to one implementation. The data shown in these figures is depicted as tables for ease of illustration, and not necessarily as a limitation. For example, other data structures such as flat files, databases, linked lists, trees, executable code, script, and so forth may be used to store the data. The data shown may also have additional rows, columns, or their equivalent in other data structures.

The acquisition option data 114 may include one or more of an option identifier (ID) 202, option rank 204, and one or more attributes in the attribute data 206. The option ID 202 is indicative of a particular acquisition option. In this illustration, each row in the table is representative of a particular acquisition option. The acquisition option module 110 may associate the option ID 202 with the acquisition option. The option rank 204 indicates a ranking or order of the acquisition options that is determined by the acquisition option module 110. For example, an acquisition option with an option rank 204 of "1" may be designated as the reference acquisition option, while those acquisition options with lesser option ranks 204 are designated as the candidate acquisition options.

The attribute data 206 may include one or more of seller identifier (ID) 208, price 210, delivery time 212, delivery type 214, new/used 216, or other data that is associated with a particular item ID. For example, the other data may include a stock level indicative of a quantity on hand, customer incentives, and so forth. Continuing the example, the customer incentives may include short term discounts, discounts for automatically recurring orders, affinity marketing program rewards, cash back, rebates, promotional offerings, and so forth.

The seller identifier (ID) 208 is representative of the seller who is associated with the acquisition option. For example, the same item ID may be available for acquisition from a plurality of different sellers.

The price 210 is indicative of the price of the item associated with that acquisition option. For example, the price may be specified by the seller indicated by the seller ID 208.

The delivery time 212 is indicative of how long delivery of the item may take or is promised to take. For example, the delivery time 212 may be indicative of an estimated delivery time or may be indicative of a confirmed or promised delivery time.

The delivery type 214 indicates how the item would be delivered using that acquisition option. For example, the delivery type 214 may be representative of delivery via ground carrier, postal service, pickup by the user from a facility, aerial drone, and so forth. In some implementations the delivery type 214 may be indicative of a particular delivery service or company.

The new/used 216 data provides information indicative of whether the item is new or used. For example, a seller may offer a used item, refurbished item, reconditioned item, and so forth.

In other implementations the acquisition option data 114 may include other information.

The caption request 116 may comprise at least a portion of the acquisition option data 114 and may also include context data 230. For example, the acquisition option data 114 may include fifteen different acquisition options. The caption request 116 may include all fifteen, or may comprise a subset, such as the top five acquisition options as indicated by the option rank 204.

The context data 230 may include information such as a user identifier indicative of a particular user, delivery address, and so forth. In some implementations the acquisition option module 110 may use information such as user preference data 128, acquisition history data 130, and so forth to determine the acquisition option data 114. The context data 230 may include information such as preferred benefit type, selected benefit type, and so forth.

The caption module 120 may use the context data 230 to determine which attribute data 206 to consider in determining the caption. For example, if the context data 230 indicates the preferred language is English, the caption module 120 will determine a caption that uses English.

The difference data 122 is also shown. The difference data 122 provides, for individual ones of the acquisition options as indicated by option ID 202, differences for different types of attributes 240. The different types of attribute 240 may include one or more of seller difference 242, price difference 244, delivery time difference 246, delivery type difference 248, new/used difference 250, and so forth. Other attributes 240 may include promotional programs, subscription options, financing options, payment programs, and so forth. For example, an acquisition option may provide for installment payments.

The differences are determined by the caption module 120 for particular types of attribute 240 with respect to a reference acquisition option. As shown, the reference acquisition option having an option ID 202 of "1" being compared to itself would have no differences. Differences are determined between like attributes. For example, the price difference 244 for the option ID 202 of "2" comprises a difference between the price 210 of option ID "1" and the price 210 of option ID "2", or $-2.

One implementation of the caption library 126 is shown. A caption identifier (ID) 260 is indicative of a particular caption and distinguishes that caption from others. In some implementations one or more of a benefit type 262, language identifier (ID) 264, or caption text 266 may be associated with the caption ID 260. The benefit type 262 may indicate a category of benefit that the particular caption ID 260 is deemed to be applicable to. For example, a caption ID 260 that is associated with a reduced delivery time 212 relative to the reference acquisition option may be associated with the benefit type 262 of "shorter delivery time". The language identifier (ID) 264 is indicative of the language which that caption is associated with. The caption text 266 comprises text that is used for presentation in the caption element 162. For example, the caption text 266 may comprise "get it faster", "need it now", "like new, save with used", and so forth. Instead of, or in addition to caption text 266, the caption ID 260 may be associated with other indicia. For example, the caption ID 260 may be associated with one or more of an icon, graphic data, audio data, dynamic data, or other information. Continuing the example, dynamic data may comprise information that is updated specific to the associated acquisition option. In one implementation, a dynamic data caption text may be "Save 17%" with the "17%" being calculated as a price difference 244 divided by the price of the first acquisition option.

Turning to FIG. 3, the user preference data 128 may include a user identifier (ID) 302, and one or more of preferred benefit type 304, preferred language identifier (ID) 306, or other information. For example, user ID "54815" prefers the benefit type of "shorter delivery time" and captions in English. The caption module 120 may use this information to select the particular type of caption to use. For example, in some situations a plurality of different captions may be applicable given the differences indicated in the difference data 122. The captions having a benefit type 262 which matches the preferred benefit type 304 may be selected and provided in the caption output data 132.

The user preference data 128 may be determined based on completed acquisitions, interactions with a user interface, and so forth. In some implementations, the user preference data 128 may be determined based on the particular types of acquisition options that the user selects within a user interface 104, based on the navigation controls activated by the user, and so forth. For example, the user may use a control in a user interface 104 to scroll through or otherwise change presentation to show several different acquisition options. Information such as how an acquisition option was presented on screen, whether the user selected it or navigated to another acquisition option, and so forth may be obtained and used to determine the user preference data 128.

The acquisition history data 130 may include the user ID 302 and one or more of a selected benefit type 320, selection percentage 322, or other information. The acquisition history data 130 may provide information indicative of previous selections of acquisition options by a particular user. For example, user "54815" may typically select the benefit type "shorter delivery time" 95% of the time and "lower price" 5% of the time.

The caption output data 132 may comprise the option ID 202 indicative of a particular acquisition option and one or more of the caption text 266 or caption priority 340. The caption priority 340 may indicate a relative priority of a particular option. For example, the caption module 120 may determine that based on the acquisition history data 130 the user ID "54815" has a history of picking the selected benefit type 320 of "shorter delivery time" 95% of the time and "lower price" 5% of the time. The caption priority 340 may thus indicate that the acquisition option with the caption associated with "get it faster" has a higher priority than the acquisition option with the "willing to wait" caption.

The user interface module 150 may use the caption output data 132 to generate the user interface data 152 and the resulting user interface 104. Continuing the example, the user "Bob" who is associated with the user ID "54815" may see in the user interface 104 acquisition option elements 158 that are presented in the user interface 104 in order based on the caption priority 340. As shown in FIG. 1, the acquisition option with the option ID 202 of "3" which has a caption priority 340 and a caption text 266 of "get it faster" is presented in the acquisition option element 158(2), immediately below the reference acquisition option shown in the acquisition option element 158(1).

In some implementations the caption priority 340 may be determined dynamically. Techniques such as a multi-armed bandit model or Thompson sampling may be used to determine the effectiveness of presenting particular captions. For example, priorities may be assigned to acquisition options such that two similar captions are presented that provide the same benefit type but with differently worded caption text 266. The results of which acquisition options are selected by a user may then be used to determine whether one caption text 266 and associated caption ID is more effective than another at securing an acquisition. In another example, Thompson sampling may be used to provide a caption priority 340 of the available acquisition options.

Figure 4:
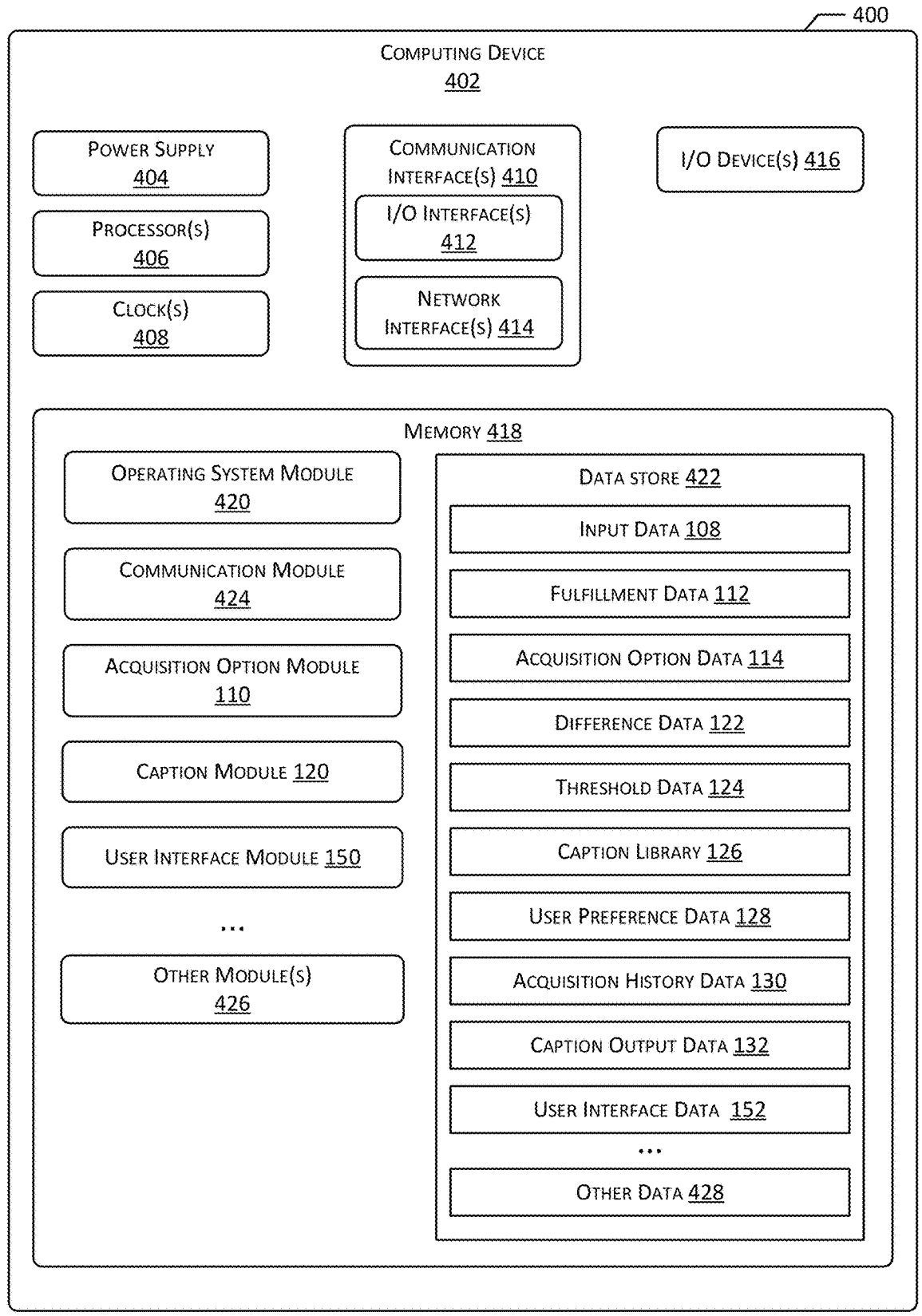
FIG. 4 is a block diagram of a computing device that may implement the system for determining and presenting captions, according to one implementation.

FIG. 4 is a block diagram of a computing device 402 that may implement the system 100 for determining and presenting captions, according to one implementation. The computing device 402 may include one or more of the first server 106 or the second server 118, and so forth.

While FIG. 4 depicts a single block diagram 400 of a computing device 402, any number and any type of computing devices 402 may be used to perform the functions described herein. For example, a single server may perform the functions of both the first server 106 and the second server 118.

One or more power supplies 404 may be configured to provide electrical power suitable for operating the components of the computing device 402. In some implementations, the power supply 404 may include a rechargeable battery, fuel cell, photovoltaic cell, power conditioning circuitry, and so forth.

The computing device 402 may include one or more hardware processor(s) 406 (processors) configured to execute one or more stored instructions. The processor(s) 406 may include one or more cores. One or more clock(s) 408 may provide information indicative of date, time, ticks, and so forth. For example, the processor(s) 406 may use data from the clock 408 to generate a timestamp, trigger a preprogrammed action, and so forth.

The computing device 402 may include one or more communication interfaces 410, such as input/output (I/O) interfaces 412, network interfaces 414, and so forth. The communication interfaces 410 may enable the computing device 402, or components of the computing device 402, to communicate with other computing devices 402 or components of the other computing devices 402. The I/O interfaces 412 may include interfaces such as Inter-Integrated Circuit (I2C), Serial Peripheral Interface bus (SPI), Universal Serial Bus (USB) as promulgated by the USB Implementers Forum, RS-232, and so forth.

The I/O interface(s) 412 may couple to one or more I/O devices 416. The I/O devices 416 may include any manner of input devices or output devices associated with the computing device 402. For example, I/O devices 416 may include touch sensors, keyboards, mouse devices, microphones, image sensors, cameras, scanners, displays, speakers, haptic devices, printers, and so forth. In some implementations, the I/O devices 416 may be physically incorporated with the computing device 402. In other implementations, I/O devices 416 may be externally placed.

The network interfaces 414 may be configured to provide communications between the computing device 402 and other devices, such as the I/O devices 416, routers, access points, and so forth. The network interfaces 414 may include devices configured to couple to one or more networks including local area networks (LANs), wireless LANs (WLANs), wide area networks (WANs), wireless WANs, and so forth. For example, the network interfaces 414 may include devices compatible with Ethernet, Wi-Fi, Bluetooth, ZigBee, Z-Wave, 3G, 4G, LTE, and so forth.

The computing device 402 may include one or more busses or other internal communications hardware or software that allows for the transfer of data between the various modules and components of the computing device 402.

As shown in FIG. 4, the computing device 402 may include one or more memories 418. The memory 418 may include one or more computer-readable storage media (CRSM). The CRSM may be any one or more of an electronic storage medium, a magnetic storage medium, an optical storage medium, a quantum storage medium, a mechanical computer storage medium, and so forth. The memory 418 may provide storage of computer-readable instructions, data structures, program modules, and other data for the operation of the computing device 402. A few example modules are shown stored in the memory 418, although the same functionality may alternatively be implemented in hardware, firmware, or as a system on a chip (SoC).

The memory 418 may include one or more operating system (OS) modules 420. The OS module 420 may be configured to manage hardware resource devices such as the I/O interfaces 412, the network interfaces 414, the I/O devices 416, and to provide various services to applications or modules executing on the processors 406. The OS module 420 may implement a variant of the FreeBSD operating system as promulgated by the FreeBSD Project; UNIX or a UNIX-like operating system; a variation of the Linux operating system as promulgated by Linus Torvalds; the Windows operating system from Microsoft Corporation of Redmond, Wash., USA; or other operating systems.

One or more data stores 422 and one or more of the following modules may also be associated with the memory 418. The modules may be executed as foreground applications, background tasks, daemons, and so forth. The data store(s) 422 may use a flat file, database, linked list, tree, executable code, script, or other data structure to store information. In some implementations, the data store(s) 422 or a portion of the data store(s) 422 may be distributed across one or more other devices including other computing devices 402, network attached storage devices, and so forth.

A communication module 424 may be configured to establish communications with one or more other computing devices 402. Communications may be authenticated, encrypted, and so forth.

The memory 418 may also store the acquisition option module 110, the caption module 120, the user interface module 150, and so forth.

Other modules 426 may also be present in the memory 418. For example, a user authentication module may authenticate users. In another example, an order generation module may initiate or generate an order based on the selection of an acquisition option and activation of an acquisition control element 164.

The data store 422 may store the information described previously, including one or more of the input data 108, the fulfillment data 112, the acquisition option data 114, the difference data 122, the threshold data 124, the caption library 126, the user preference data 128, the acquisition history data 130, the caption output data 132, the user interface data 152, and so forth.

Other data 428 within the data store(s) 422 may include configurations, settings, preferences, and default values associated with computing devices 402. Other data 428 may also include encryption keys and schema, access credentials, and so forth.

In different implementations, different computing devices 402 may have different capabilities or capacities. For example, servers may have greater processing capabilities or data storage capacity than the user devices 102.

Figure 5:
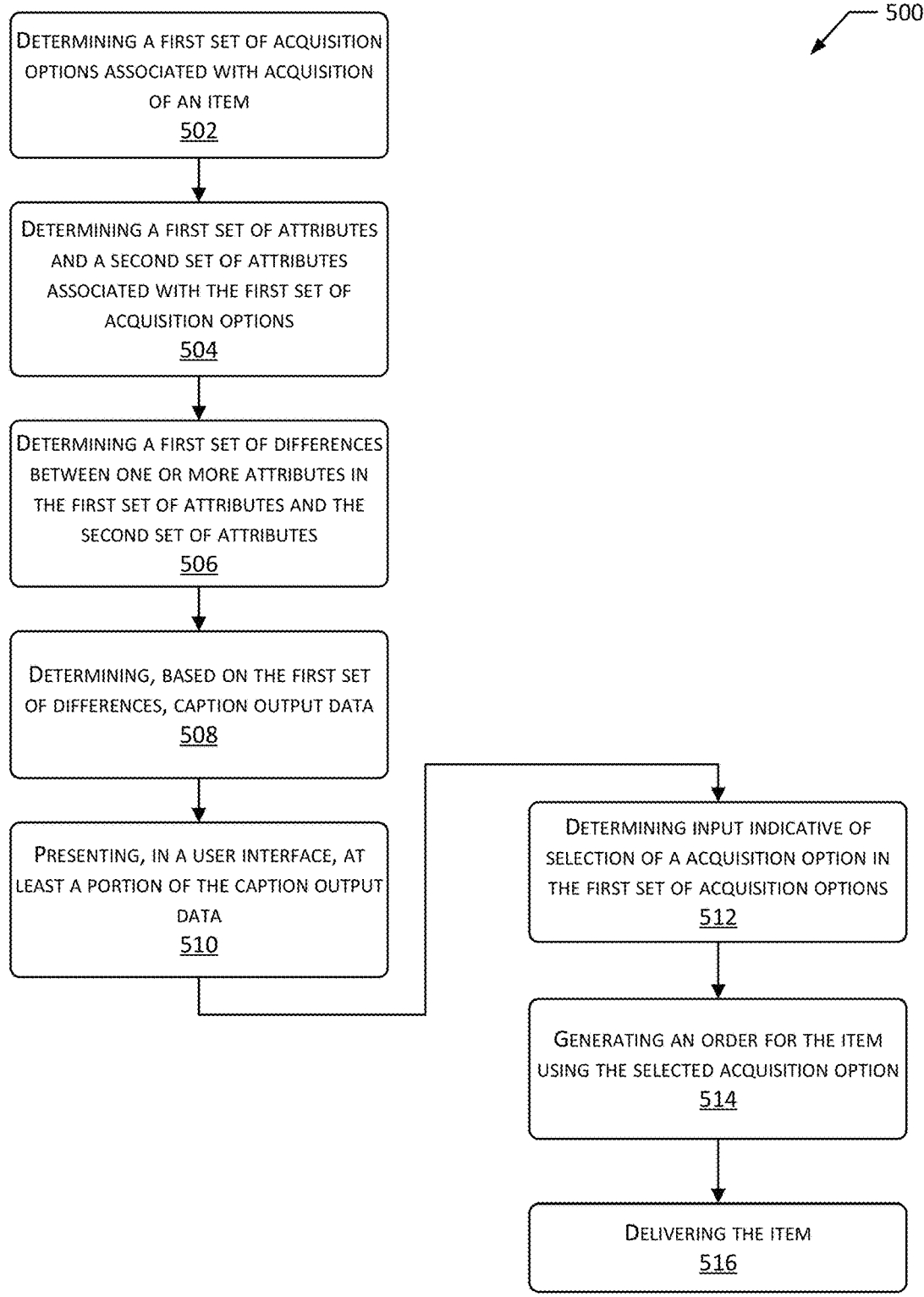
FIG. 5 is a flow diagram of a method for determining and presenting captions, according to one implementation.

FIG. 5 is a flow diagram 500 of a method for determining and presenting captions, according to one implementation. The method may be implemented at least in part by one or more of the user device 102, the first server 106, or the second server 118.

At 502 a request is received comprising a first acquisition option and a second acquisition option associated with acquisition of an item. For example, the first server 106 may send a caption request 116 to the second server 118.

The first acquisition option may be designated a reference acquisition option. The second acquisition option may be representative of one or more of: a second delivery time of the second acquisition option that is earlier than a first delivery time of the first acquisition option, a second cost of the second acquisition option that is less than a first cost of the first acquisition option, or a second incentive of the second acquisition option that differs from a first incentive of the first acquisition option.

At 504 a first set of attributes and a second set of attributes that are associated with the first set of acquisition options are determined. For example, the attribute data 206 in the acquisition option data 114 may be accessed.

At 506, a first set of differences are determined between one or more attributes in a first set of attributes and one or more attributes in a second set of attributes. For example, the first set of attributes may comprise the attribute data 206 associated with a first or reference acquisition option while the second set of attributes comprise the attribute data 206 associated with a first candidate acquisition option. The acquisition options are associated with acquisition of the item.

In some implementations, the threshold data 124 may be used to determine whether a difference is to be considered. For example, the difference may be compared to a threshold value in the threshold data 124. In some implementations the difference that is greater than or less than the threshold value may be determined to be indicative of a difference that is beneficial to present to the user. For example, if the price difference is less than a threshold value of zero (indicating a lower price), the difference may be used to determine the caption ID 202.

In one implementation the determination of the differences may be determined for particular attributes. For example, a first attribute and a second attribute that are associated with the first acquisition option are determined. A third attribute and a fourth attribute that are associated with the second acquisition option are determined. The first attribute and the third attribute are determined to be representative of a first type of attribute 240. The second attribute and the fourth attribute are determined to be representative of a second type of attribute 240. The first type of attribute 240 is determined to be associated with a first priority. The second type of attribute 240 is associated with a second priority, wherein the second priority is greater than the first priority. A difference is determined between the first attribute and the third attribute. The first caption identifier 260 is associated with the difference.

At 508, based on the first set of differences a first set of caption identifiers are determined. For example, the caption module 120 may determine the difference data 122 as described above which is indicative of the differences between the first reference acquisition option and the first candidate acquisition option.

The caption module 120 may then use the difference data 122 and the caption library 126 to determine the caption IDs 260 that correspond to one or more of the acquisition options. As described above, the caption module 120 may also use the threshold data 124, the user preference data 128, the acquisition history data 130, and so forth.

The acquisition options may be assessed using the threshold data 124, and acquisition options which are not deemed suitable may be disregarded from further consideration. For example, a third acquisition option may be determined that has a third set of attributes associated with acquisition of the item. A second set of differences between one or more attributes in the first set of attributes and one or more attributes in the third set of attributes is determined. A first difference in the second set of differences is determined to be greater than a threshold value. Continuing the example, the difference may be a price difference, and the threshold value may be zero. The first difference being greater than zero, the third acquisition option does not provide a lower price to the user. The third acquisition option may be disregarded from further consideration, and is not presented in the first user interface 104.

In one implementation, the determination of the differences may be determined for several attributes and the caption may be prioritized to a particular one of those differences. For example, a first attribute and a second attribute are determined that are associated with the first acquisition option. A third attribute and a fourth attribute that are associated with the second acquisition option are determined. A first difference between the first attribute and the third attribute is determined. A second difference between the second attribute and the fourth attribute is determined. The first difference is determined to be associated with a first priority. The second difference is determined to be associated with a second priority, wherein the second priority is greater than the first priority. The first caption identifier 260 is then determined to be associated with the fourth attribute.

The priority may be associated with a particular type of attribute 240, a magnitude of the difference, and so forth. For example, the magnitude of the difference may comprise an absolute value of the difference, such that an acquisition option with an unusually great difference may be presented.

Based at least in part on a portion of the first set of caption identifiers, caption output data 132 is determined. For example, the caption module 120 may only include in the caption output data 132 the captions in the top five as indicated by the caption priority 340.

As described above, in some implementations the caption module 120 may use one or more of user preference data 128, acquisition history data 130, or other data to determine the caption output data 132. For example, a first user ID 302 that is associated with access to the first user interface 104 may be determined. The first caption ID 260 may be determined based at least in part on the first user identifier 302. Continuing the example, the caption associated with the preferred benefit type 304 or selected benefit type 320 may be included in the caption output data 132. In some implementations the caption priority 340 may be based at least in part on this association. For example, a caption that matches a preferred benefit type 304 may have a higher caption priority 340 than a caption that does not.

In another example the acquisition history data 130 may be determined that is indicative of previous acquisition option selections. The first caption ID 260 may be determined based at least in part on the acquisition history data 130.

In some implementations, the caption output data 132 may be determined based at least in part on a priority associated with a benefit type 262. Some benefit types 262 may be associated with a greater priority than others. For example, the benefit type 262 "lower price" may have a priority of "1" while the benefit type 262 "shorter delivery time" may have a lesser priority of "2".

Based on the first set of differences, a second caption identifier 260 that is associated with the second acquisition option is determined. A first benefit type 262 associated with the first caption identifier 260 is determined. A second benefit type 262 associated with the second caption identifier 260 is determined. The inclusion of a particular caption in the caption output data 132 may be determined based on a comparison of priority for the benefit types 262. For example, the caption output data 132 may include only the top three ranked benefit types 262.

A response may be sent that comprises at least a portion of the caption output data 132. For example, the caption output data 132 may be sent to the first server 106.

At 510 at least a portion of the caption output data 132 is presented in the user interface 104. For example, the user interface module 150 may use the acquisition option data 114 and the caption output data 132 to determine the user interface data 152. The user interface data 152 is then used to present the user interface 104 on a display of the user device 102 that shows an acquisition option element 158 and an associated caption element 162 which may include the caption text 266.

At 512 input indicative of a selection of an acquisition option is determined. For example, the user may select an acquisition option by activating a control element 160 in the user interface 104 and activating an acquisition control element 164. The user device 102 may send data indicative of this selection to the first server 106 or another computing device 402.

At 514 an order for the item is generated using the selected acquisition option. In another implementation a command that initiates the order may be generated.

At 516 the order is fulfilled according to the selected acquisition option and the item is delivered.

Figure 6:
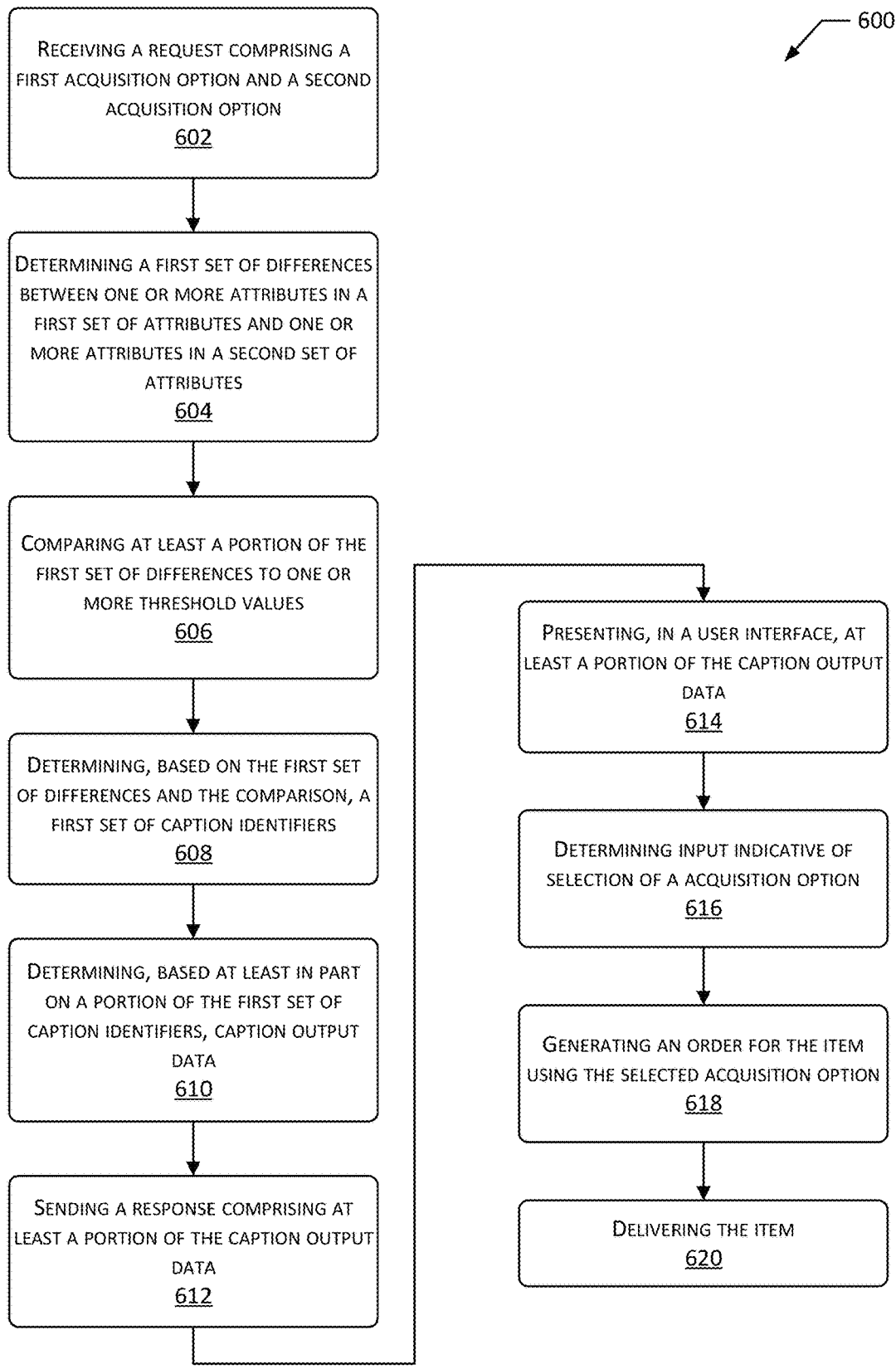
FIG. 6 is a flow diagram of a method for an application programming interface (API) to provide caption output data, according to one implementation.

FIG. 6 is a flow diagram 600 of a method for an application programming interface (API) to provide caption output data 132, according to one implementation. The method may be implemented at least in part by one or more of the user device 102, the first server 106, or the second server 118.

At 602 a request comprising a first acquisition option having a first set of attributes associated with acquisition of an item and a second acquisition option having a second set of attributes associated with acquisition of the item is received. For example, the second server 118 may be configured to receive an API request.

At 604 a first set of differences between one or more attributes in the first set of attributes and one or more attributes in the second set of attributes is determined.

At 606 at least a portion of the first set of differences are compared to one or more threshold values. For example, a difference may be compared to a threshold value stored in the threshold data 124.

At 608, based on the first set of differences and the comparison(s) of the difference(s), a first set of caption identifiers 260 is determined. For example, if the difference in delivery time is greater than a threshold value indicative of faster delivery, a caption identifier 260 associated with faster delivery may be selected.

At 610, based at least in part on at least a portion of the first set of caption identifiers 260, determine caption output data 132. For example, the captions having the k highest priority, where k is a positive integer, may be included in the caption output data 132.

At 612 a response is sent that comprises at least a portion of the caption output data 132. For example, the caption output data 132 may be sent as an API response to the first server 106.

At 614 at least a portion of the caption output data 132 is presented in the user interface 104.

At 616 input indicative of a selection of an acquisition option is determined.

At 618 an order for the item is generated using the selected acquisition option. In another implementation a command that initiates the order may be generated.

At 620 the order is fulfilled according to the selected acquisition option and the item is delivered.

Figure 7:
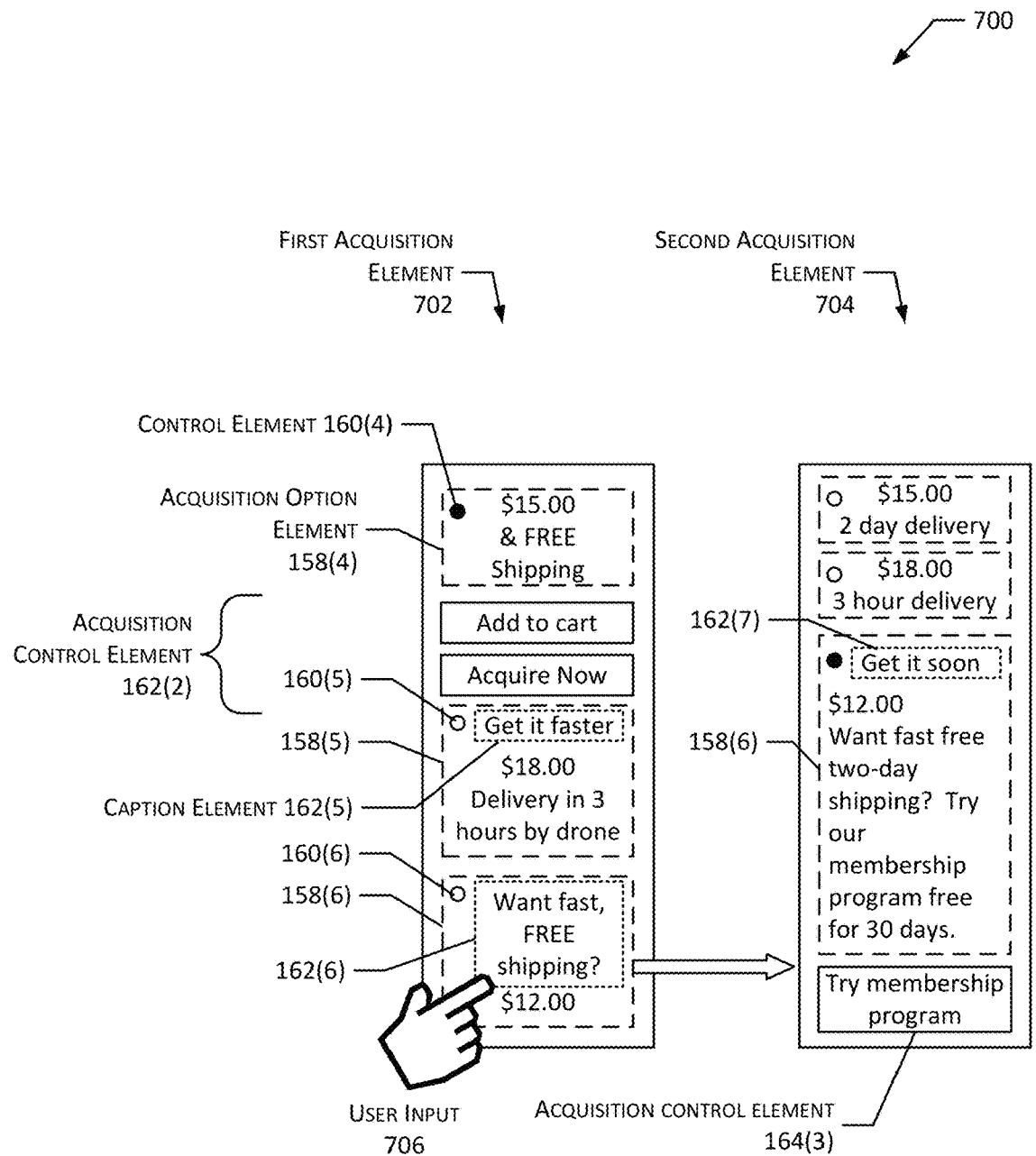
FIG. 7 depicts a user interface with a plurality of acquisition options that include captions, according to one implementation.

FIG. 7 depicts a user interface 700 with a plurality of acquisition options that include captions, according to one implementation. The acquisition element 156 may be dynamic, changing in response to user input. For example, as a user activates particular control elements 160 to select a particular acquisition option element 158 representative of a particular acquisition option, additional information may be presented as shown here.

A first acquisition element 702 and a second acquisition element 704 are shown. The first acquisition element 702 includes acquisition option elements 158(4), 158(5), and 158(6) with their respective control elements 160(4), 160(5), and 160(6). Caption elements 162(5) and 162(6) and presented with regard to acquisition option elements 158(5) and 158(6), respectively. Also shown are acquisition control elements 162(2).

In this illustration, the reference acquisition option is selected by default as shown by the solid black circle of control element 160(4). The caption elements 162 provide the user with a clear and concise description of the benefits to the user associated with the particular acquisition options. The user provides user input 706 to select the acquisition option element 158(6). Upon selection, the second acquisition element 704 may be presented. In one implementation the second acquisition element 704 may replace the first acquisition element 702. In another implementation the first acquisition element 702 and the second acquisition element 704 may both be presented.

The second acquisition element 704 presents the acquisition option elements 158 as before, but the acquisition option element 158(6) has been expanded to provide more information. Information associated with the other acquisition option elements 158(4) and 158(5) may be reduced as shown here to provide more display area for the selected acquisition option element 158(6). In this illustration the caption element 162(7) for the acquisition option element 158(6) has changed relative to the first acquisition element 702. For example, in the first acquisition element 702 the caption reads "Want fast, FREE shipping?" while the caption for the second acquisition element 704 reads "get it soon". This change in caption may be due to the context of the information presented in the second acquisition element 704. For example, the additional detail as shown in the acquisition option element 158(6) of the second acquisition element 704 would be redundant to the "want fast, FREE shipping" caption. Instead, the caption now presents "get it soon" emphasizing the speedy shipment without being duplicative.

The second acquisition element 704 also includes an acquisition control element 164(3). In this illustration, the acquisition control element 164(3) corresponds to the acquisition option presented by the acquisition option element 158(6) which refers to a membership program.

Figure 8:
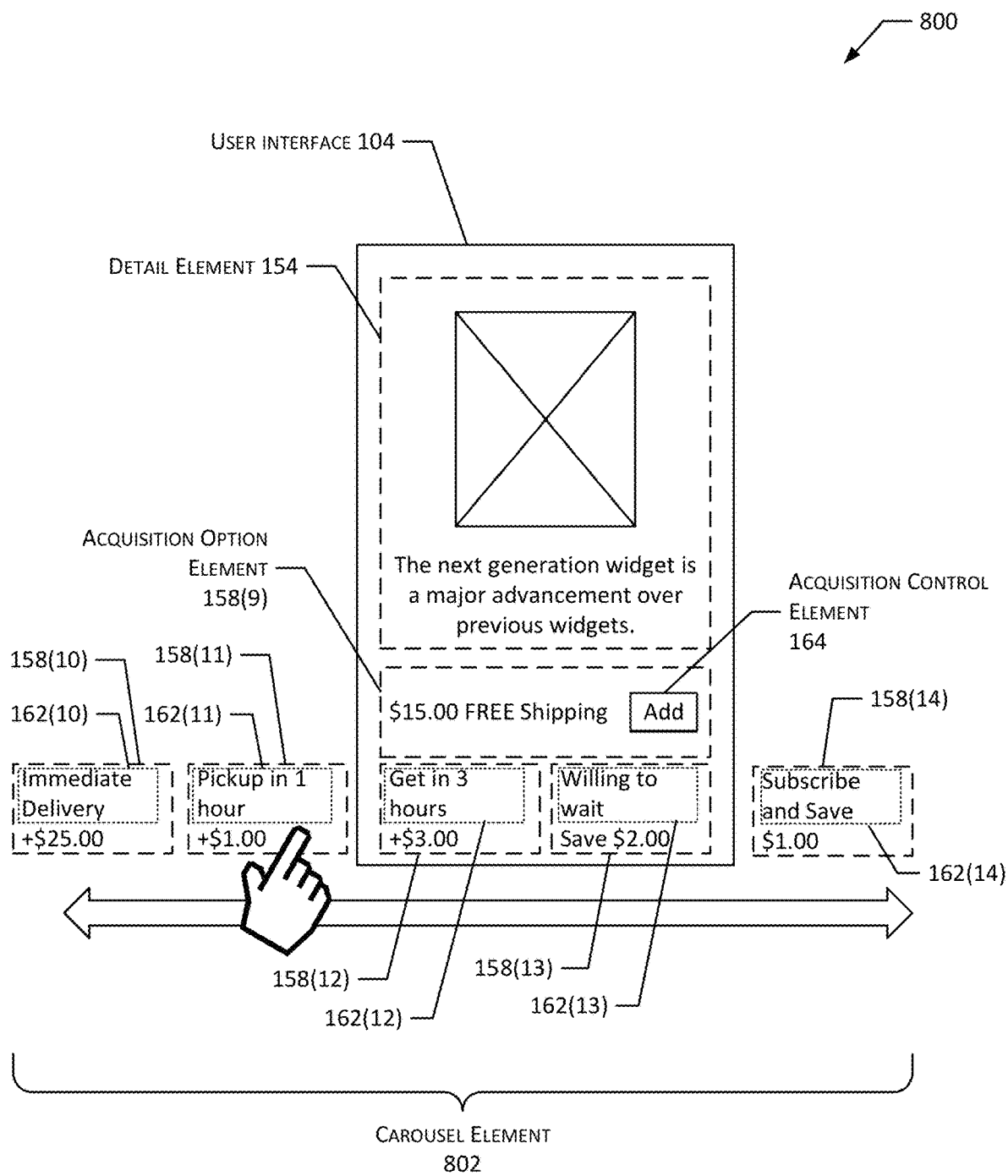
FIG. 8 depicts a user interface with a plurality of acquisition options that include captions presented using a carousel, according to one implementation.

FIG. 8 is a depiction 800 of a user interface 104 with a plurality of acquisition options that include captions presented using a carousel element 802, according to one implementation. Also visible in the user interface 104 is a detail element 154 and an acquisition option element 158(9) with an acquisition control element 164. Proximate to one edge of the user interface 104 is a carousel element 802 that is configured to present at a given time, a subset of the acquisition option elements 158 representing acquisition options for the item depicted in the detail element 154. By providing an input such as a finger gesture on a touch sensor, different acquisition option elements 158 may be presented and then selected by the user. In this illustration, the acquisition option element 158 in the carousel element 802 includes a caption element 162 which provides information indicative of a difference between the acquisition option associated with that acquisition option element 158 and the acquisition option element 158(9).

Figure 10:
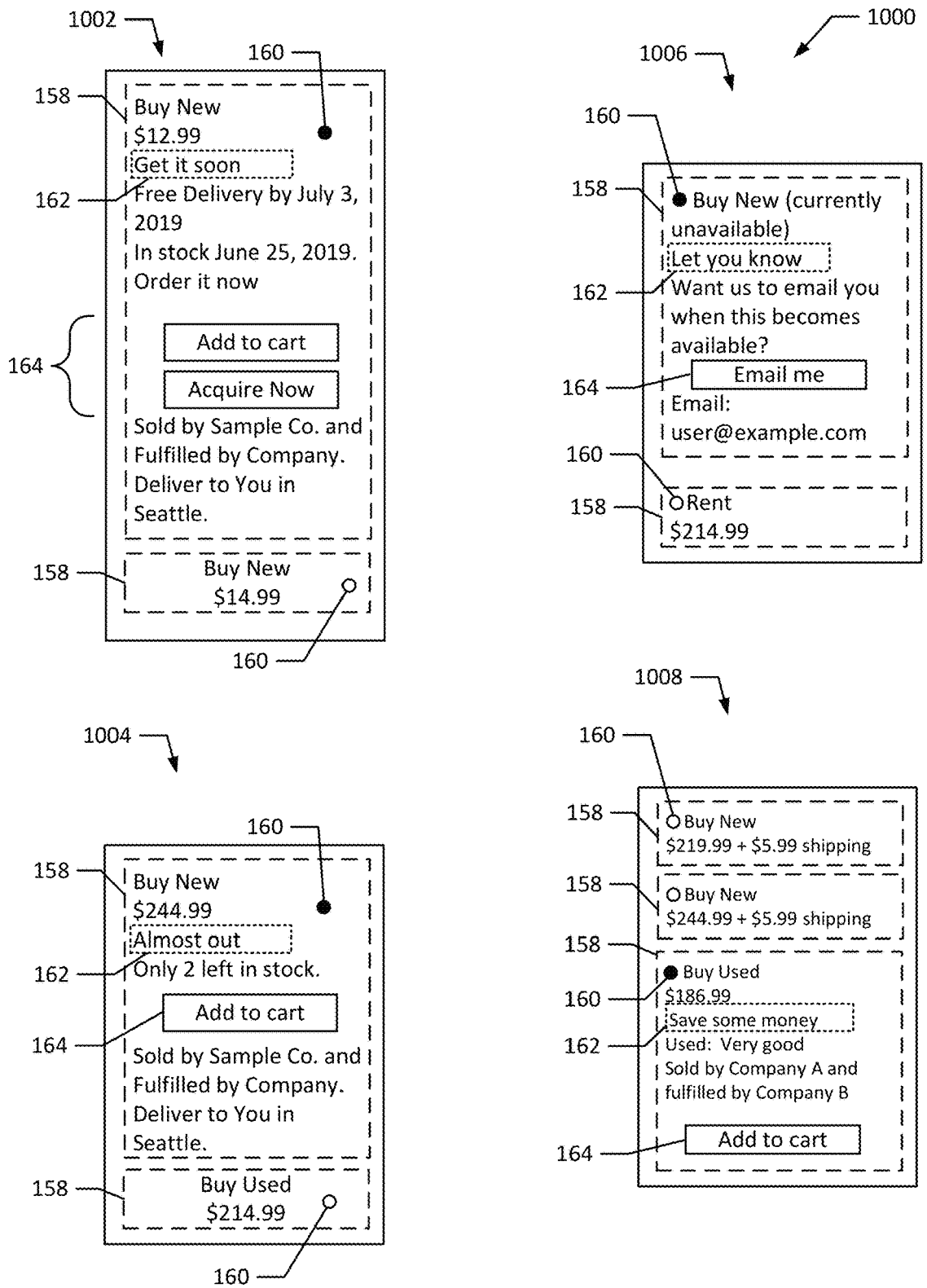
Figure 11:
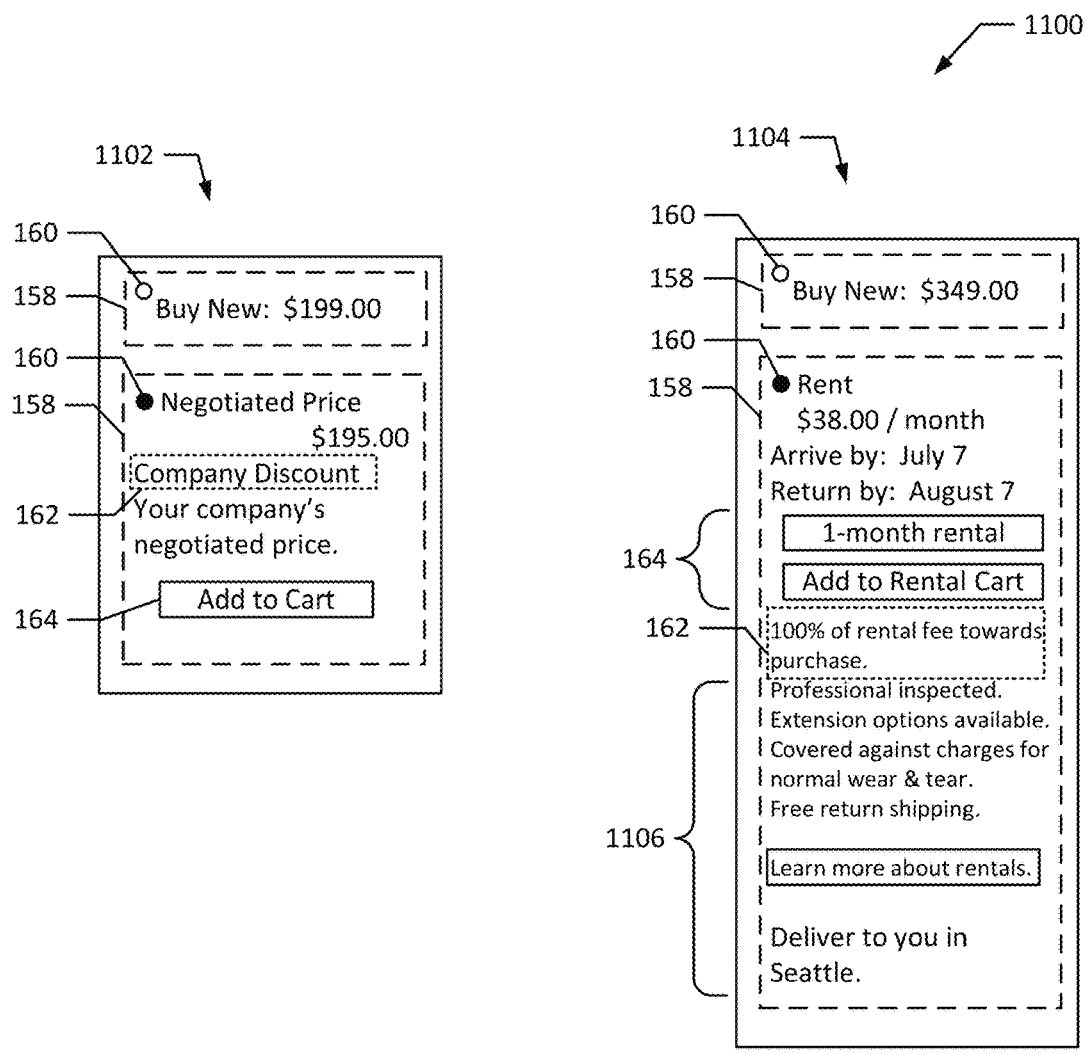

FIGS. 9-11 depict user interfaces 104 that may include captions, according to some implementations. These user interfaces 104 may be presented individually, or in conjunction with a detail element 154. For example, the user interfaces 104 depicted in FIGS. 9-11 may be presented as an accordion graphical user interface feature. The user interfaces may comprise one or more of acquisition option elements 158, control elements 160, caption elements 162, acquisition control elements 164, or other elements. For example, a user interface 912 may include selection elements 914 to allow for the selection of a make and model of a device for return credit. In another example, a user interface 104 may include information 1106 about a program associated with the acquisition option.

In other implementation other user interface arrangements may be used.

The processes discussed in this disclosure may be implemented in hardware, software, or a combination thereof. In the context of software, the described operations represent computer-executable instructions stored on one or more computer-readable storage media that, when executed by one or more hardware processors, perform the recited operations. Generally, computer-executable instructions include routines, programs, objects, components, data structures, and the like that perform particular functions or implement particular abstract data types. Those having ordinary skill in the art will readily recognize that certain steps or operations illustrated in the figures above may be eliminated, combined, or performed in an alternate order. Any steps or operations may be performed serially or in parallel. Furthermore, the order in which the operations are described is not intended to be construed as a limitation.

Embodiments may be provided as a software program or computer program product including a non-transitory computer-readable storage medium having stored thereon instructions (in compressed or uncompressed form) that may be used to program a computer (or other electronic device) to perform processes or methods described in this disclosure. The computer-readable storage medium may be one or more of an electronic storage medium, a magnetic storage medium, an optical storage medium, a quantum storage medium, and so forth. For example, the computer-readable storage media may include, but is not limited to, hard drives, floppy diskettes, optical disks, read-only memories (ROMs), random access memories (RAMs), erasable programmable ROMs (EPROMs), electrically erasable programmable ROMs (EEPROMs), flash memory, magnetic or optical cards, solid-state memory devices, or other types of physical media suitable for storing electronic instructions. Further, embodiments may also be provided as a computer program product including a transitory machine-readable signal (in compressed or uncompressed form). Examples of transitory machine-readable signals, whether modulated using a carrier or unmodulated, include, but are not limited to, signals that a computer system or machine hosting or running a computer program can be configured to access, including signals transferred by one or more networks. For example, the transitory machine-readable signal may comprise transmission of software by the Internet.

Separate instances of these programs can be executed on or distributed across any number of separate computer systems. Although certain steps have been described as being performed by certain devices, software programs, processes, or entities, this need not be the case, and a variety of alternative implementations will be understood by those having ordinary skill in the art.

Additionally, those having ordinary skill in the art will readily recognize that the techniques described above can be utilized in a variety of devices, environments, and situations. Although the subject matter has been described in language specific to structural features or methodological acts, it is to be understood that the subject matter defined in the appended claims is not necessarily limited to the specific features or acts described. Rather, the specific features and acts are disclosed as exemplary forms of implementing the claims.

What is claimed is:

1. A system comprising:
one or more memories storing computer-executable instructions; and
one or more hardware processors to execute the computer-executable instructions to:
receive user input to acquire an item;
determine a first acquisition option for acquisition of the item, wherein the first acquisition option includes a first attribute indicative of a characteristic by which the item is able to be acquired;
determine a second acquisition option for the acquisition of the item, wherein the second acquisition option includes a second attribute indicative of the characteristic by which the item is able to be acquired;
determine a difference between the first attribute of the first acquisition option and the second attribute of the second acquisition option;
determine that the difference between the first attribute and the second attribute is greater than a threshold value;
in response to the difference associated with the first acquisition option and the second acquisition option being greater than the threshold value, determine a first caption that comprises text indicative of a first benefit associated with the second acquisition option, wherein the first benefit is associated with the difference between the first attribute and the second attribute;

present a user interface that includes:
the first acquisition option in a first portion of the user interface; and
the second acquisition option and the first caption in a second portion of the user interface;
receive user input indicative of selection of the second acquisition option; and
generate an order for the acquisition of the item using the second acquisition option.

2. A method performed using one or more computing devices, the method comprising:
determining a first acquisition option having a first set of attributes associated with acquisition of an item, wherein the first set of attributes indicates one or more characteristics by which the item is able to be acquired;
determining a second acquisition option having a second set of attributes associated with acquisition of the item, wherein the second set of attributes indicates the one or more characteristics by which the item is able to be acquired;
determining a first difference between a first attribute of the first set of attributes and a second attribute of the second set of attributes;
determining that the first difference is greater than a first threshold value;
in response to the first difference being greater than the first threshold value,
determining a first caption identifier that is associated with the first difference;
determining, based at least in part on the first caption identifier, a first caption output, wherein the first caption output is indicative of the first difference;
causing presentation in a first user interface of a first user interface element associated with the first acquisition option; and
causing presentation in the first user interface of a second user interface element associated with the second acquisition option and the first caption output.

3. The method of claim 2, wherein the second acquisition option is representative of one or more of:
a second delivery time of the second acquisition option that is earlier than a first delivery time of the first acquisition option,
a second cost of the second acquisition option that is less than a first cost of the first acquisition option, or
a second incentive of the second acquisition option that differs from a first incentive of the first acquisition option.

4. The method of claim 2, further comprising:
determining a second difference between a third attribute of the first set of attributes and a fourth attribute of the second set of attributes, wherein the second difference is greater than a second threshold value, and wherein the determining the first caption identifier is further in response to the second difference being greater than the second threshold value.

5. The method of claim 2, wherein the first user interface comprises one or more of a graphical user interface or a voice user interface.

6. The method of claim 4, further comprising:
determining the first attribute and the third attribute are representative of a first type of attribute;
determining the second attribute and the fourth attribute are representative of a second type of attribute;
determining that the first type of attribute is associated with a first priority; and
determining that the second type of attribute is associated with a second priority, wherein the second priority is less than the first priority; and
wherein the first caption identifier is associated with the first difference in response to the second priority being less than the first priority.

7. The method of claim 4, further comprising:
determining that the first difference is associated with a first priority; and
determining that the second difference is associated with a second priority, wherein the second priority is less than the first priority; and
wherein the first caption identifier indicative of the first difference is determined based at least in part on the second priority being less than the first priority.

8. The method of claim 2, further comprising:
determining a first user identifier that is associated with access to the first user interface;
determining acquisition history data associated with the first user identifier, wherein the acquisition history data indicates one or more previous acquisition option selections associated with the first user identifier; and
determining that the first caption identifier corresponds to at least one of the one or more previous acquisition option selections associated with the first user identifier;
wherein the first caption identifier is further determined based at least in part on the acquisition history data.

9. The method of claim 2, further comprising:
determining acquisition history data indicative of one or more previous acquisition option selections associated with the one or more of the second acquisition option or the second set of attributes; and
determining that the first caption identifier corresponds to at least one of the one or more previous acquisition option selections;
wherein the first caption identifier is further determined based at least in part on the acquisition history data.

10. The method of claim 2, further comprising:
determining input associated with the second user interface element;
determining input that is indicative of acquisition of the item; and
generating an order for the item using the second acquisition option.

11. The method of claim 2, further comprising:
determining a third acquisition option having a third set of attributes associated with acquisition of the item;
determining a second difference between one or more attributes in the first set of attributes and one or more attributes in the third set of attributes;
determining that the second difference is less than a second threshold value; and
in response to the second difference being less than the second threshold value, disregarding the third acquisition option from presentation in the first user interface.

12. The method of claim 2, further comprising:
determining a second caption identifier that is associated with the first difference;
determining a first benefit type associated with the first caption identifier;
determining that the first benefit type is associated with a first priority;

determining a second benefit type associated with the second caption identifier; and determining that the second benefit type is associated with a second priority that is less than the first priority, wherein the first caption identifier is determined further in response to the second priority being less than the first priority.

13. A method performed using one or more computing devices, the method comprising:

receiving an application programming interface (API) request associated with a user identifier, the API request comprising:

a first acquisition option having a first set of attributes associated with acquisition of an item, wherein the first set of attributes indicates one or more characteristics by which the item is able to be acquired; and a second acquisition option having a second set of attributes associated with acquisition of the item, wherein the second set of attributes indicates the one or more characteristics by which the item is able to be acquired;

determining acquisition history data indicative of one or more previous selections of acquisition options that are associated with:

the user identifier; and one or more attributes of the first set of attributes or the second set of attributes;

wherein the one or more previous selections are indicative of characteristics by which one or more items were previously acquired;

based on the acquisition history data, determining a first set of differences between the one or more attributes in the first set of attributes and the one or more attributes in the second set of attributes;

determining, based on the first set of differences, a first set of caption identifiers;

determining, based at least in part on at least a portion of the first set of caption identifiers, caption output data; and sending a response comprising at least a portion of the caption output data.

14. The method of claim 13, wherein the first set of attributes and the second set of attributes are indicative of one or more of:

a seller, a price, a delivery time, a delivery type, the item being new or used, a stock level, or a customer incentive.

15. The method of claim 13, further comprising:

determining a first attribute and a second attribute that are associated with the first acquisition option;

determining a third attribute and a fourth attribute that are associated with the second acquisition option;

determining a first difference between the first attribute and the third attribute;

determining a second difference between the second attribute and the fourth attribute;

determining that the first difference is associated with a first priority;

determining that the second difference is associated with a second priority, wherein the second priority is greater than the first priority; and wherein the first set of caption identifiers are ranked based on the first priority and the second priority.

16. The method of claim 13, further comprising:

determining a count of user identifiers that is associated with the first acquisition option and the second acquisition option, wherein the acquisition history data is further determined based on the count of user identifiers; and determining that at least a portion of the first set of caption identifiers is associated with one or more previous selections of acquisition options.

17. The method of claim 13, wherein the first set of caption identifiers are also based at least in part on the acquisition history data.

18. The method of claim 13, further comprising:

determining, for one or more caption identifiers in the first set of caption identifiers, one or more benefit types;

determining a priority that is associated with the one or more benefit types; and wherein the caption output data is indicative of the priority that is associated with the one or more benefit types.

19. The method of claim 13, further comprising:

determining that an individual difference in the first set of differences that is associated with a first type of attribute is greater than a threshold value associated with the first type of attribute; and wherein a caption identifier of the first set of caption identifiers is determined for the individual difference in response to the individual difference being greater than the threshold value.

20. The system of claim 1, further comprising computer-executable instructions to:

determine a second caption that comprises text indicative of one or more of the first benefit or a second benefit associated with the second acquisition option with respect to the difference; and determine that a first priority associated with the first caption is greater than a second priority associated with the second caption, wherein the first caption is presented in the second portion of the user interface further in response to the first priority being greater than the second priority.

* * * * *